No. 646,477. Patented Apr. 3, 1900.
R. E. TWYFORD.
DRIVING GEAR FOR MOTOR CARRIAGES.
(Application filed July 7, 1898. Renewed Sept. 11, 1899.)
(No Model.) 2 Sheets—Sheet 1.
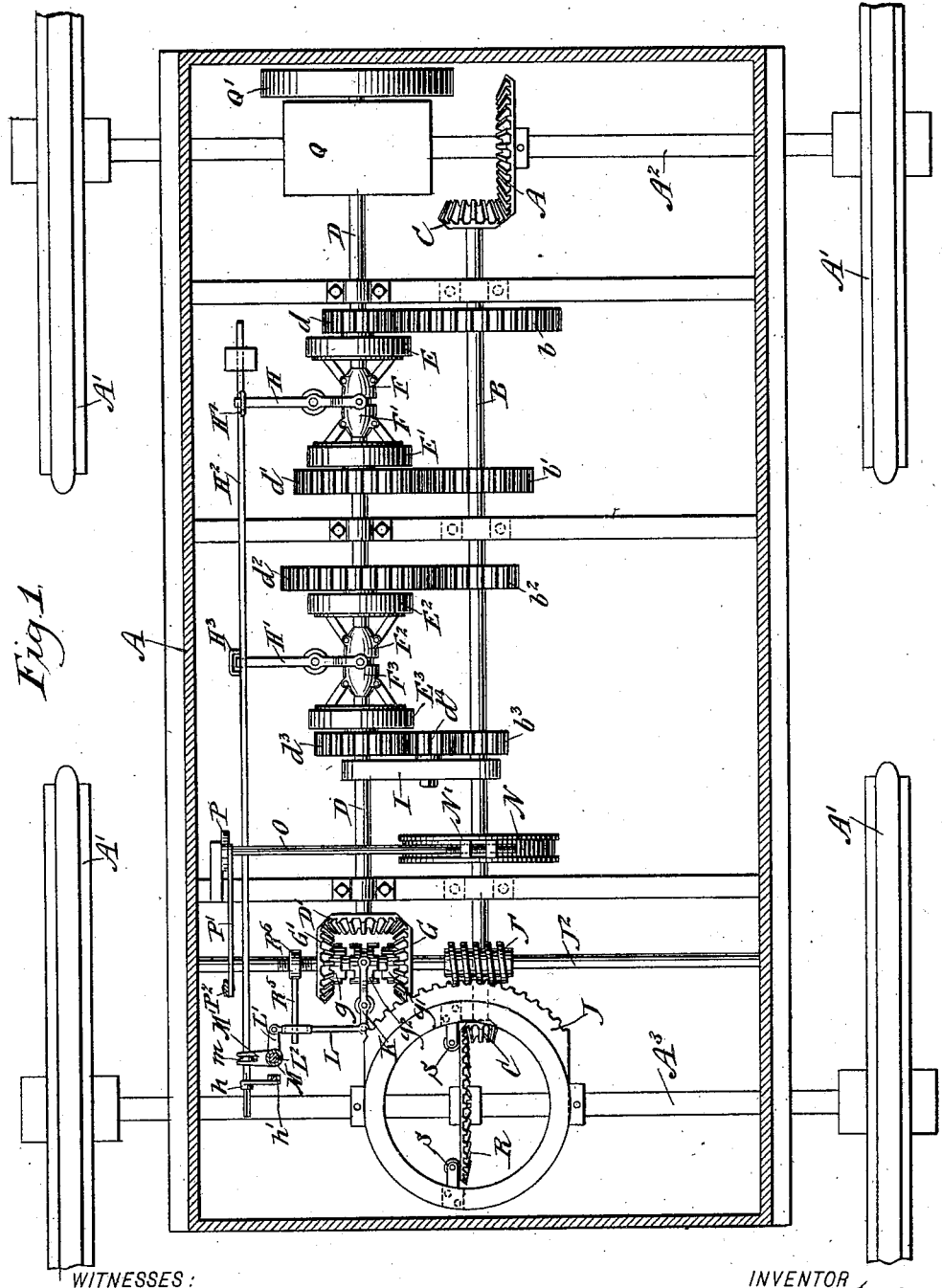
WITNESSES:
Edward Thorpe
H. L. Reynolds
INVENTOR
R. E. Twyford
BY
ATTORNEYS.

No. 646,477. Patented Apr. 3, 1900.
R. E. TWYFORD.
DRIVING GEAR FOR MOTOR CARRIAGES.
(Application filed July 7, 1898. Renewed Sept. 11, 1899.)
(No Model.) 2 Sheets—Sheet 2.
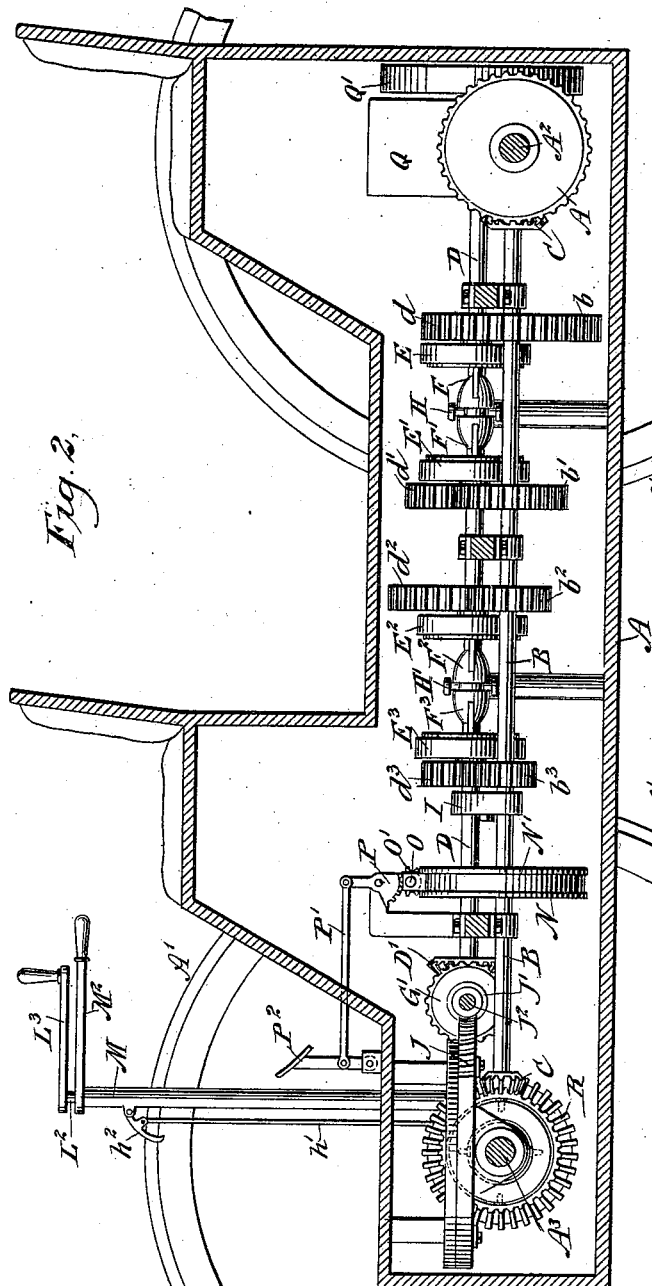
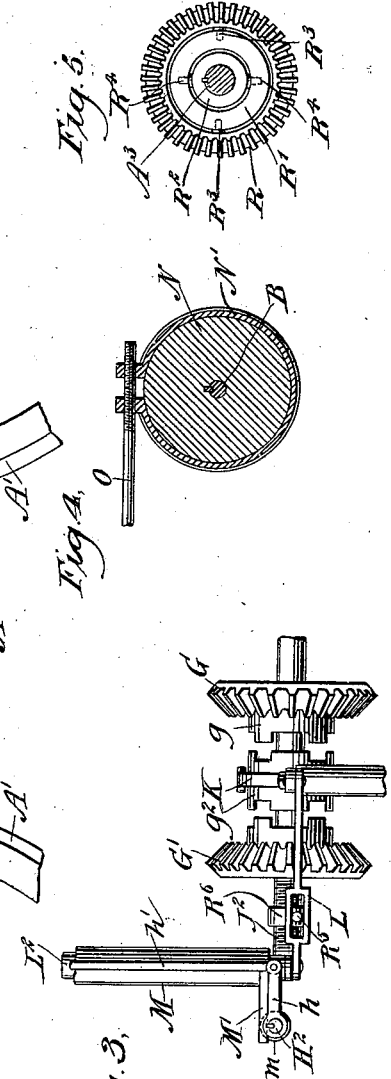

UNITED STATES PATENT OFFICE.

ROBERT E. TWYFORD, OF PITTSBURG, PENNSYLVANIA.

DRIVING-GEAR FOR MOTOR-CARRIAGES.

SPECIFICATION forming part of Letters Patent No. 646,477, dated April 3, 1900.

Application filed July 7, 1898. Renewed September 11, 1899. Serial No. 730,182. (No model.)

*To all whom it may concern:*

Be it known that I, ROBERT E. TWYFORD, of Pittsburg, in the county of Allegheny and State of Pennsylvania, have invented certain new and useful Improvements in Driving-Gears for Motor-Carriages, of which the following is a full, clear, and exact description.

My invention relates to certain improvements in the driving mechanism of motor-carriages by which the management and control of the carriage are facilitated; and it consists of novel means for connecting the power-shaft with both forward and rear axle by which all the wheels may be employed to drive the carriage of an improved steering-gear and an improved brake mechanism.

It consists, further, of the novel features of construction hereinafter described and claimed.

Reference is to be had to the accompanying drawings, forming a part of this specification, in which similar characters of reference indicate corresponding parts in all the figures.

Figure 1 is a sectional plan view taken through the body of the carriage, showing the driving mechanism. Fig. 2 is a longitudinal sectional elevation of the same. Fig. 3 is a detail elevation of the power steering mechanism. Fig. 4 is a transverse sectional view of the brake, and Fig. 5 is a face view of the driving-gear upon the forward axle.

The objects of my invention are to produce a motor-carriage in which all the wheels may be used for traction purposes, in which a large variation in speed may be quickly obtained by simple mechanism, to provide a simple and effective brake, and to provide a power steering device controlled by a hand-lever and having a safety mechanism attached which will prevent throwing the steering-axle at too great an angle. These results are accomplished by the means hereinafter shown and described.

My mechanism is intended to be used in connection with any form of motor. As herein shown, an electric motor Q is provided, which is connected directly with the longitudinally-extending shaft D and is provided with a fly-wheel Q' to insure a storage of power. The shaft D extends nearly the whole length of the carriage.

Within the body of the carriage is a shaft B, extending longitudinally thereof and provided at each end with bevel-pinions C, meshing, respectively, with a bevel-gear A, fixed upon the rear axle $A^2$ of the carriage, and a bevel-gear R upon the forward axle $A^3$, said axles carrying wheels A'. The gear R is a special gear consisting of a ring having teeth thereon and supported by two concentric rings R' and $R^2$, the latter being fixed to the axle $A^3$ centrally of its pivot-point. Each ring is journaled upon the one next within by pivots $R^3$ and $R^4$, the set of pivots being at right angles to each other, thus forming a universal joint which will permit the axle to turn without the wheel changing its position or its rotative connection with the axle. The toothed ring R is held in engagement with the pinion C by rollers S, which are carried by the fifth-wheel J and bear against the back of the ring R.

The two shafts B and D are parallel with each other and are connected near their forward ends by a bar I, said shafts turning in suitable bearings in cross-bars in the carriage-body. A series of connecting mechanisms are employed, each consisting of a train of gears so proportioned that the speeds vary in each set. One set consists of the gears $d$ and $b$, in which the gear $d$ is the driver and is of smaller diameter than the gear $b$. In the next set, consisting of the gears $d'$ and $b'$, the gears are more nearly of the same size, which produces an increase in the speed. In the third set, consisting of the gears $d^2$ and $b^2$, the gear $d^2$ is the larger, which produces a suitable increase in the speed. In the fourth set, which consists of the gears $d^3$, $d^4$, and $b^3$, the third gear $d^4$ is an idler. This set of driving mechanism is brought into use when it is desired to reverse the direction of travel of the carriage. Each of these sets of driving mechanisms is provided with a suitable clutch mechanism, by means of which the loose member of any one of the set of driving mechanisms may be brought into use. The clutch mechanism may be of any suitable form. As herein shown, it consists of the outer shells E, E', $E^2$, and $E^3$, which are fixed to the corresponding gears, and the inner expanding members F F' $F^2$ $F^3$, the expanding members being keyed to revolve with the shaft D. These driving connections are arranged in pairs, and the clutches of each pair are controlled by levers H and H'. It will be seen that when a lever H or H' is thrown in one direction one of the clutches is thrown into use, while if the lever is thrown in the opposite direction the other clutch is thrown into use. All of these clutches are controlled by a single rod H², which extends parallel with the shaft D and at a slight distance therefrom. This rod H² is adjacent to the outer ends of the levers H and H' and is mounted so as to have a reciprocating motion and also so as to turn. Close to the outer ends of the levers H and H' the rod H² is provided with loops or staples H³ and H⁴, adapted to engage the ends of the levers H and H'. These staples are placed at different angles, so that when one embraces the end of its lever the other will be at such an angle as to clear the end of the other lever.

One end of the rod H² is provided with a crank $h$, mounted to slide on the shaft and controlled by a link or rod $h'$, extending upward to a point where it is accessible by the man who is controlling the carriage, said link or rod being connected with a lever $h^2$, by which it may be drawn up or thrown down. By this means the rod H² may be turned so as to throw either of the loops or staples H³ and H⁴ into engagement with its proper lever. At the same end of the rod H² is secured a collar $m$, engaged by the forked end of a crank M', mounted upon the lower end of a tubular shaft or pipe M. This shaft or pipe extends upward through the body of the carriage and at its upper end is provided with an operating crank or lever M², so that it may be readily rotated upon its axis, whereby the rod H² may be given a reciprocating motion, and thus act upon whichever lever H or H' it is connected with, so as to throw one of the clutches into operation.

Passing through the bore of the tubular shaft or pipe M is a shaft L², provided at its upper end with an operating crank or lever L³. At the lower end of this shaft is fixed a crank-arm L', connected with a link L, and the link L is provided with an opening adapted to receive the end of an arm R⁵, extending radially from a collar R⁶, threaded upon a laterally-extending shaft J, journaled in the sides of the carriage. This shaft J² has a worm J' thereon, which engages the toothed edge of the fifth-wheel J. Upon the shaft J² are loosely mounted two bevel-gears G and G', each provided upon their inner faces with one of the halves $g$ and $g'$ of two clutches. The other halves of the clutches are upon a sliding block $g^2$, located between the halves $g$ $g'$. The position of this block is controlled by a lever K, which is connected at one end to the link L and at the other end to the block $g^2$.

A bevel-gear D' upon the shaft D engages both of the bevel-gears G and G'. If the central member $g^2$ of the clutch on the shaft J² is engaged with one of the bevel-gears G or G', the shaft J² will be rotated in one direction, and if the said central member of the clutch is engaged with the opposite bevel-gear G or G' the shaft J² will be turned in the opposite direction. If, however, the engagement of these clutches were continued too long, the carriage might be turned too short or overturned, and it is to provide against this that the arm R⁵ and the opening in the link L are provided. The collar R⁶, which carries the arm R⁵, will be given a lateral movement corresponding with the amount of motion given to the fifth-wheel. When the collar R⁶ has traveled far enough to engage the arm R⁵ with one end of the opening in the link L, the arm will operate the clutch mechanism, so as to disengage it from the bevel-gear, and will thus prevent accident.

The brake mechanism consists of a wheel N, mounted upon the shaft B and having a band N' surrounding the same. The two ends of the band N' are connected by a rod O, which has right and left threads cut thereon near its ends and screws into the ends of the band. Upon one end of the rod O is mounted a pinion O', with which mesh the teeth upon one end of a segment P, connected by a link P' with a foot-lever P² or any other suitable means for operating the brake. Pressure upon the foot-lever P² will oscillate the lever P and by its toothed connection with the rod O rotate the rod, so as to draw the two ends of the band closer together, and thus brake the wheel N.

By this construction a number of speeds can be secured in the same carriage by the use of very simple, cheap, and durable mechanism, all of these speeds being controlled by one lever. The same levers are also used for reversing the carriage. The construction is thus rendered more simple than where numerous levers are necessary to be used in controlling the different speeds. In addition to this all of the wheels being utilized as driving-wheels enables more power to be advantageously applied to driving the carriage and also enables the carriage to overcome grades or loads which would not otherwise be possible. The power steering means makes the steering certain and rapid, while relieving the operator of the labor and strain involved in hand-steering, and the safety device prevents turning the front axle too far. The efficient brake used also contributes largely to the safety of operation. These devices all contribute to produce a very powerful and efficient motor-carriage, and yet one which is simple in construction and operation and not excessive in cost.

Various changes in the proportions and minor details may be made without departing from the spirit of my invention. Hence I consider myself entitled to all such variations as come within the scope of my claims.

Having thus described my invention, I claim as new and desire to secure by Letters Patent—

1. A motor-carriage having a motor-shaft, a carriage-driving shaft, and a series of connecting driving mechanisms arranged in pairs, and each having a loose member and a clutch engaging therewith, an operating-lever for the clutch of each pair, an operating-rod for said levers, mounted to slide and turn, and having radial projections varying in their position for each lever, and means for turning and reciprocating said rod, substantially as shown and described.

2. A motor-carriage having a motor-shaft, a carriage-driving shaft, and a series of connecting driving mechanisms arranged in pairs, and each having a loose member and a clutch engaging therewith, an operating-lever for the clutch of each pair, an operating-rod for said lever, mounted to slide and turn, and having a loop or staple thereon for each clutch-lever and located so as to swing over the ends of the clutch-levers when the shaft is turned, the rod lying above the end of one clutch-lever and below the end of the other, and means for turning and reciprocating the rod, substantially as shown and described.

3. A motor-carriage having a motor-shaft, a carriage-driving shaft, and a series of connecting driving mechanisms arranged in pairs, each having a loose member and a clutch member engageable therewith, a clutch-operating lever for each pair of driving mechanisms, an operating-rod for said levers, mounted to slide and turn, a loop or staple for each clutch-operating lever and carried by said rod, said loops being located so as to engage one end of the clutch-levers, the rod lying above the end of one clutch-lever and below the end of the other lever, a controlling-shaft provided with means for turning it manually, and connections from the shaft to the rod, for giving it reciprocations, a crank upon the rod, and a controlling-lever connected therewith by which it may be turned, substantially as shown and described.

4. A steering apparatus for motor-carriages, comprising a power-transmitting shaft oppositely-facing gears loosely mounted thereon, rotative connection from said gears to the propelling mechanism, clutches upon the shaft, adapted to engage and lock either gear to the shaft, means for controlling the clutches, comprising a link having an opening therein, a shaft having a threaded section, a nut thereon, and connections from said nut to the link, whereby its motion is limited, substantially as shown and described.

5. A steering apparatus for motor-carriages, comprising a power-transmitting shaft, oppositely-facing gears loosely mounted thereon, rotative connection from said gears to the propelling mechanism, clutches upon the shaft, adapted to engage and lock either gear to the shaft, means for controlling the clutches, comprising a link having an opening therein and extending parallel with the shaft, and an arm having a hub threaded on the shaft and extending through the opening in the link, substantially as shown and described.

6. A steering mechanism for motor-carriages, comprising a power-transmitting shaft, oppositely-facing gears loosely mounted thereon, rotative connection from said gears to the propelling mechanism, clutches upon the shaft, adapted to engage and lock either gear to the shaft, means for controlling the clutches, comprising a link having an opening therein and extending parallel with the shaft, an arm having a hub threaded on the shaft and extending through the opening in the link, and a hand-operated crank connected to the said link for controlling the clutches, substantially as shown and described.

7. A steering apparatus for motor-carriages, comprising a toothed fifth-wheel, a shaft having a worm thereon engaging the teeth of said fifth-weel, oppositely-facing gears loosely mounted on said shaft, rotative connection from said gears to the propelling mechanism, clutches upon the shaft, adapted to engage and lock either gear to the shaft, means for controlling the clutches, a link having an opening therein, and an arm having a hub threaded on the shaft and extending through the opening in the link, substantially as shown and described.

8. A motor-carriage having a driving-shaft extending longitudinally of the carriage and connected with the motor, a bevel-pinion upon each end of the shaft, a bevel-gear upon the rear axle of the carriage and engaging one of the said pinions, the front axle having a pivotal support permitting its swinging, a bevel-gear carried by the front axle and engaging the other pinion upon the driving-shaft, said gear consisting of concentric rings pivoted to each other by sets of pivots which are at right angles to each other, the inner ring being fixed to the axle coincident with its turning pivot, and rollers engaging the sides of the beveled toothed ring and holding the latter in engagement with its pinion.

ROBERT E. TWYFORD.

Witnesses:
JOHN W. SHERRER,
J. L. VAN GORDER.